(12) United States Patent
Grellier

(10) Patent No.: US 7,324,975 B1
(45) Date of Patent: Jan. 29, 2008

(54) METHOD FOR MANAGING COMMANDS IN SEVERAL APPLICATION FILES AND MICROCHIP CARD FOR IMPLEMENTING SAID METHOD

(75) Inventor: Stéphane Grellier, Isdes (FR)

(73) Assignee: Axalto SA, Meudon (FR)

( * ) Notice: Subject to any disclaimer, the term of this patent is extended or adjusted under 35 U.S.C. 154(b) by 0 days.

(21) Appl. No.: 10/030,327

(22) PCT Filed: Apr. 28, 2000

(86) PCT No.: PCT/FR00/01137

§ 371 (c)(1),
(2), (4) Date: May 13, 2002

(87) PCT Pub. No.: WO00/67212

PCT Pub. Date: Nov. 9, 2000

(30) Foreign Application Priority Data

Apr. 29, 1999 (FR) .................................. 99 05444

(51) Int. Cl.
*G06F 17/60* (2006.01)
(52) U.S. Cl. ............................ 705/51; 705/1; 713/200; 713/202
(58) Field of Classification Search .................. 705/1, 705/50, 51; 713/200, 202
See application file for complete search history.

(56) References Cited

U.S. PATENT DOCUMENTS

| | | | | |
|---|---|---|---|---|
| 4,882,474 A | | 11/1989 | Anderl et al. | ................ 235/380 |
| 5,161,110 A | * | 11/1992 | Dorchak | ..................... 700/108 |
| 5,495,521 A | * | 2/1996 | Rangachar | ............... 379/93.04 |
| 5,600,818 A | | 2/1997 | Weikmann | ................... 395/490 |
| 5,638,443 A | * | 6/1997 | Stefik et al. | .................. 705/54 |
| 5,835,727 A | * | 11/1998 | Wong et al. | ................ 709/238 |
| 5,881,230 A | * | 3/1999 | Christensen et al. | ........ 709/203 |
| 6,006,328 A | * | 12/1999 | Drake | ......................... 726/23 |

FOREIGN PATENT DOCUMENTS

| | | |
|---|---|---|
| EP | 0 644 513 A2 | 3/1995 |
| EP | 0 717 339 A2 | 6/1996 |

\* cited by examiner

*Primary Examiner*—Bradley Bayat
*Assistant Examiner*—John Winter
(74) *Attorney, Agent, or Firm*—Osha Liang LLP

(57) ABSTRACT

The invention relates to a method for controlling commands in several application files, whereby an access condition corresponding to said command is associated with each command in each application file, each command in each application file is executed if a user orders the execution thereof and if the access condition corresponding to said command is stored. According to the invention, the access conditions are stored jointly for all application files.

14 Claims, 3 Drawing Sheets

| | |
|---|---|
| | |
| | |
| | |
| | |

FIG.1

| | |
|---|---|
| ≪ BANK ACCOUNT ≫ | ≪ CHV1 ≫ |
| | |
| | |
| | |

FIG.2

| | |
|---|---|
| ≪ BANK ACCOUNT ≫ | ≪ CHV2 ≫ |
| ≪ BANK ACCOUNT ≫ | ≪ CHV1 ≫ |
| | |
| | |

FIG.3

| | |
|---|---|
| STOCK EXCHANGE | ≪ CHV1 ≫ |
| ≪ BANK ACCOUNT ≫ | ≪ CHV2 ≫ |
| ≪ BANK ACCOUNT ≫ | ≪ CHV1 ≫ |
| | |

FIG.4

| | |
|---|---|
| STOCK EXCHANGE | ≪ CHV2 ≫ |
| STOCK EXCHANGE | ≪ CHV1 ≫ |
| ≪ BANK ACCOUNT ≫ | ≪ CHV2 ≫ |
| ≪ BANK ACCOUNT ≫ | ≪ CHV1 ≫ |

FIG.5

METHOD FOR MANAGING COMMANDS IN SEVERAL APPLICATION FILES AND MICROCHIP CARD FOR IMPLEMENTING SAID METHOD

FIELD OF THE INVENTION

The invention concerns a method for managing commands in several application files and a microchip card adapted to manage commands in several application files.

BACKGROUND OF THE INVENTION

There currently exist command managing method adapted to manage commands in several application files. These methods are for example adapted to manage commands, such as creating or opening or deleting a sub-file in a first file concerning a first application, or those creating or opening or deleting a sub-file of a second file concerning a second application. The means implementing these methods are called "operating systems".

A user who wishes to order execution of this operation needs to satisfy the access condition associated with the command in the application file.

In certain application files, these access conditions have been standardised. Thus, there is for example the standard EN 726-3 for command management methods in microchip cards. This standard mentions for example an access condition marked "ALW" for which the user does not need to satisfy any condition: thus an operation in an application, file associated with the access condition "ALW" shall still be executed if the user orders this. This standard also mentions an access condition marked "NEV": if the user orders the execution of an operation in an application file associated with the access condition "NEV", this operation shall not be executed. Apart from other things, this standard also mentions access conditions marked "CHV1" and "CHV2".

The command management methods in several known application files does not make it possible to jointly manage commands for different application files. Thus, when an operator has commands executed in a first application file, when he moves to a second application file to have commands executed and when he returns to the first application file, he again needs to satisfy the access conditions so as to execute in the first application file commands similar to those he initially had executed.

SUMMARY OF THE INVENTION

The object of the invention is to provide a method for managing commands in several application files able to be easily implemented with full security at a reduced cost enabling this problem to be resolved.

More specifically, the invention concerns a method for managing commands in several application files, an access condition corresponding to a command being associated with each command in each application file, each command in each application file being executed if a user has ordered execution of said command and if the access condition corresponding to said command is stored, said method being characterised in that the access conditions are jointly stored for all the application files to which the user has had access.

A user having ordered the execution of a command in an application file preferably:
seeks to see if the access condition corresponding to said command is stored,
if the access condition is stored, execution of the command is then launched,
if not, the user is asked to satisfy the access condition and then, if the user satisfies the access condition, the access condition is stored and execution of the command is launched.

Advantageously, with n denoting a upper whole number or equal to two and the user having satisfied n access conditions, the latest n satisfied access conditions are stored.

Preferably, when a new access condition is satisfied by the user, said access condition not being stored and n access conditions being stored, the memory of the oldest satisfied access condition is deleted and the newly satisfied access condition is stored.

According to a first implementation of the method, n is equal to the number of access conditions for all the commands of all the application files.

According to a second implementation of the method, n is greater than the number of access conditions for all the commands of all the application files.

According to a third implementation of the method, n is less than the number of access conditions for all the commands of all the application files.

Advantageously, once a contact is established to start said command management method is interrupted, all the access conditions are deleted.

The invention also concerns a microchip card adapted to manage commands in several application files, an access condition corresponding to a command being associated with each said command in each application file, each command in each application file being executed if a user has ordered execution of said order and if the access condition corresponding to said order is stored, said card being characterised in that it comprises means to jointly retain in a memory the access conditions for all the application files to which the user has had access.

When a user has ordered execution of a command in an application file, it preferably comprises:
adapted means to see if the access condition corresponding to said command is stored,
adapted means to launch execution of the command if the access condition is stored,
adapted means to ask the user to satisfy the access condition if the access condition is not stored, and
adapted means to store the access condition and launch execution of the command if the user satisfies the access condition.

With n denoting a whole number greater than or equal to two and the user having satisfied n access conditions, it advantageously comprises adapted means to keep in the memory the n latest satisfied access conditions.

When a new access condition is satisfied by the user and said access condition is not stored and n access conditions are stored, it preferably comprises adapted means to delete from the memory the oldest access condition and to store the newly-satisfied access condition.

According to a first embodiment, n is equal to the number of access conditions for all the commands of all the application files.

According to a second embodiment, n is greater than the number of access conditions for all the commands of all the application files.

According to a third embodiment, n is less than the number of access conditions for all the commands of all the application files.

Advantageously, the card comprises a contact and means adapted to delete all the access conditions when the contact is interrupted.

BRIEF DESCRIPTION OF THE DRAWINGS

Other characteristics and advantages of the invention shall appear more readily upon reading of the description of the following embodiment given by way of non-restrictive example with reference to the accompanying five figures on which:

FIG. 1 represents a storage table relating to a memory space in the live memory of the microchip card adapted to manage commands in several application files, the table being shown in the initial storage state, FIGS. 2 to 5 are similar to FIG. 1 for various storage states.

DETAILED DESCRIPTION

Figure 7:
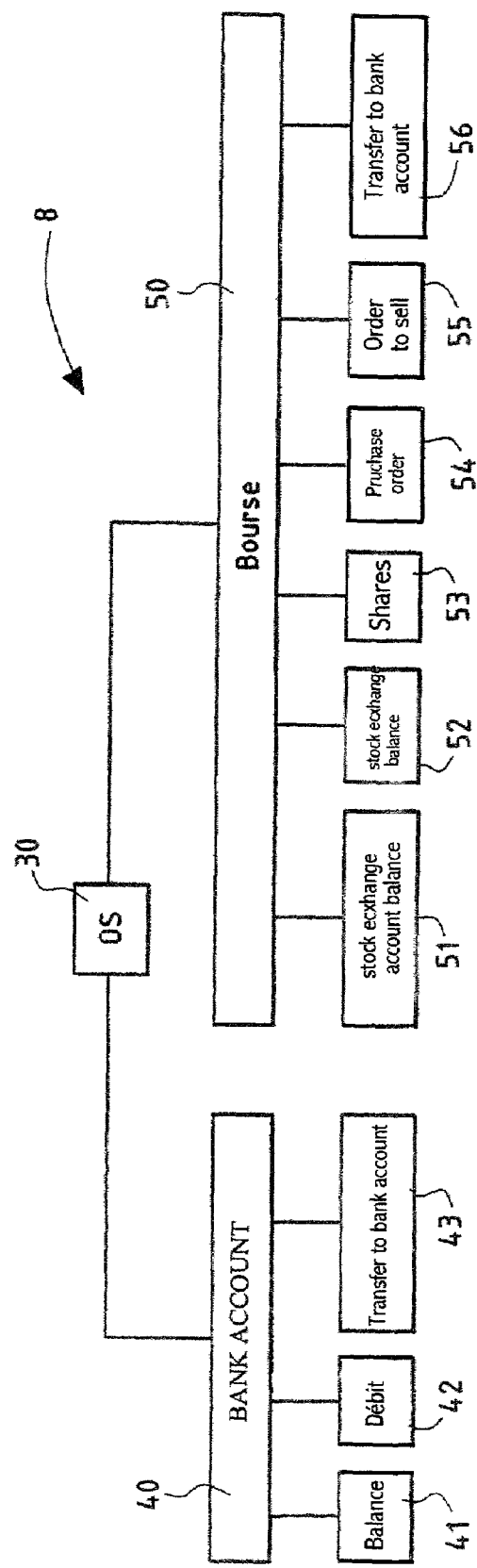
FIG. 7 represents the logic organisation of the card.

With reference more particularly to FIG. 7, this shows the logic organisation of a microchip card 8 adapted to manage commands in several application files.

The card 8 includes means to implement the command management method, said means being denoted "OS" and bearing the reference 3.

Figure 8:
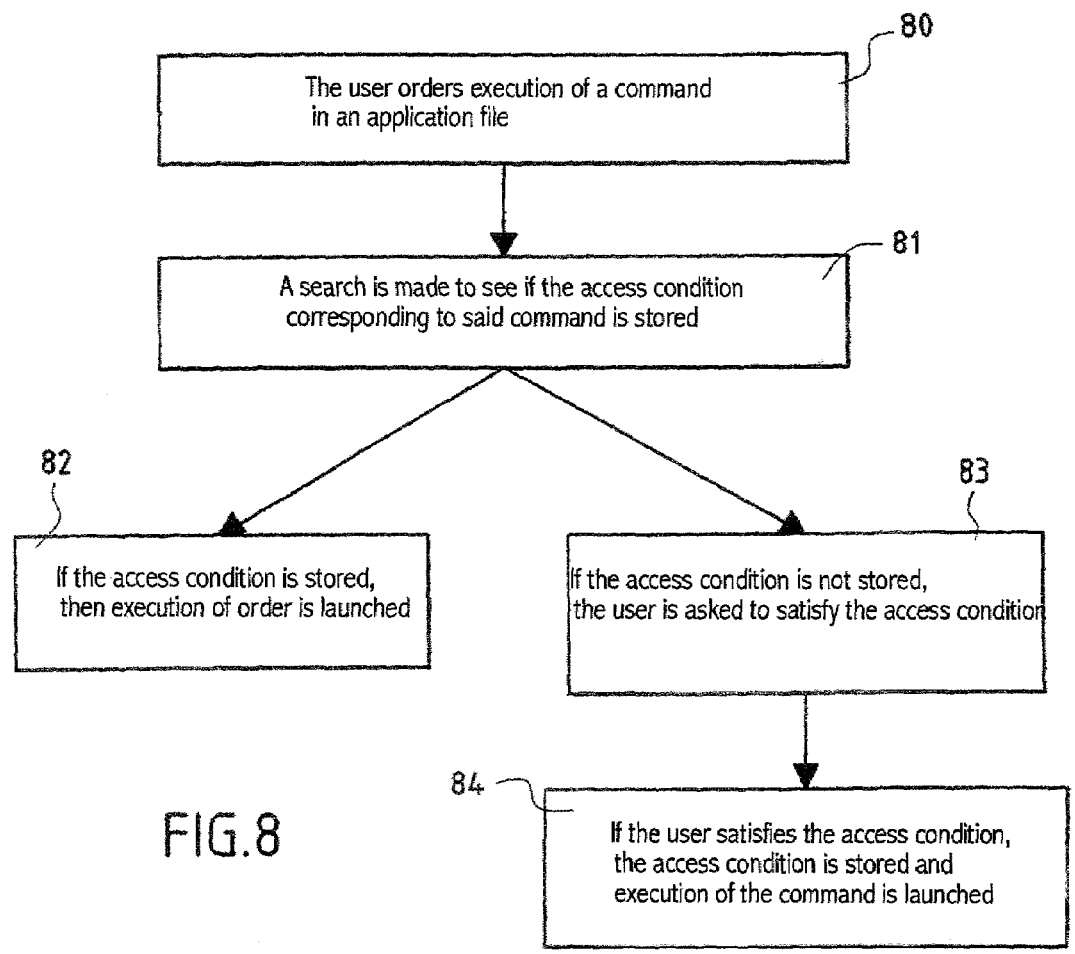
FIG. 8 represents a logic flowchart of the stages of the method of the invention.

FIG. 8 includes two application files also called directories

The first application file is called "bank account" and bears the reference 40. This application file is provided to enable a user to manage data relating to his bank account.

In the "bank account" file, the user can order execution of a command called "balance" bearing the reference 41, a command called "debit" bearing the reference 42, and a command called "transfer to stock exchange account" bearing the reference 43.

The command "balance" contains instructions enabling the user to know the balance of his bank account.

The command "debit" contains instructions enabling the user to order a debit movement of his bank account.

The command "transfer to the stock exchange account" enables the user to order transfer a certain sum from the bank account to a stock exchange account.

The second application file is called "stock exchange" and bears the reference 50. This application file is provided to enable the user to manage data relating to his stock exchange portfolio.

In the "stock exchange" file, the user can order execution of a command called "stock exchange balance" bearing the reference 51, a command called "stock exchange balance" bearing the reference 52, a command called "shares" bearing the reference 53, a command called "purchase order" bearing the reference 54, a command called "sales order" bearing the reference 55 and a command called "transfer to bank account" bearing the reference 56.

The command "stock exchange account balance" contains instructions enabling the user to know the balance of the stock exchange account provided to supply and receive the amount corresponding to the purchase and sales of stock exchange stocks ands shares.

The command "share exchange balance" contains instructions enabling the user to know the overall value of the stock exchange shares he has.

The command "shares" contains instructions enabling the user to know the stock exchange stocks and shares the use has.

The command "purchase order" enables the user to give the instruction to buy stock exchange shares.

The command "sale order" enables the user to give the instruction to sell stock exchange shares.

The command "transfer to bank account" enables the user to give the instruction to transfer a certain amount from the stock exchange account to the bank account.

So as to be able to carry out the commands "balance", "stock exchange account balance", "stock exchange balance" or "shares", the user must firstly satisfy the access conditions marked "CHV1".

So as to be able to carry out the commands "debit", "transfer to the stock exchange account", "purchase order", "sales order" or "transfer to the bank account, the user must firstly satisfy the access conditions marked "CHV2".

The card 8 comprises means represented by a table so as to retain in the memory the access conditions jointly for all the application files.

The table comprises two columns and four lines. The number of lines is the number of access conditions for all the commands of all the application files: the card in fact includes two application files and each of them comprises two access conditions for all its commands.

When an access condition in an application file is stored, the address of the application features on a line of the first column and said condition appears on the same line of the second column. Conversely, when an access condition in an application file is not stored, the address of the application file does not appear in any line of the first column.

Figure 6:
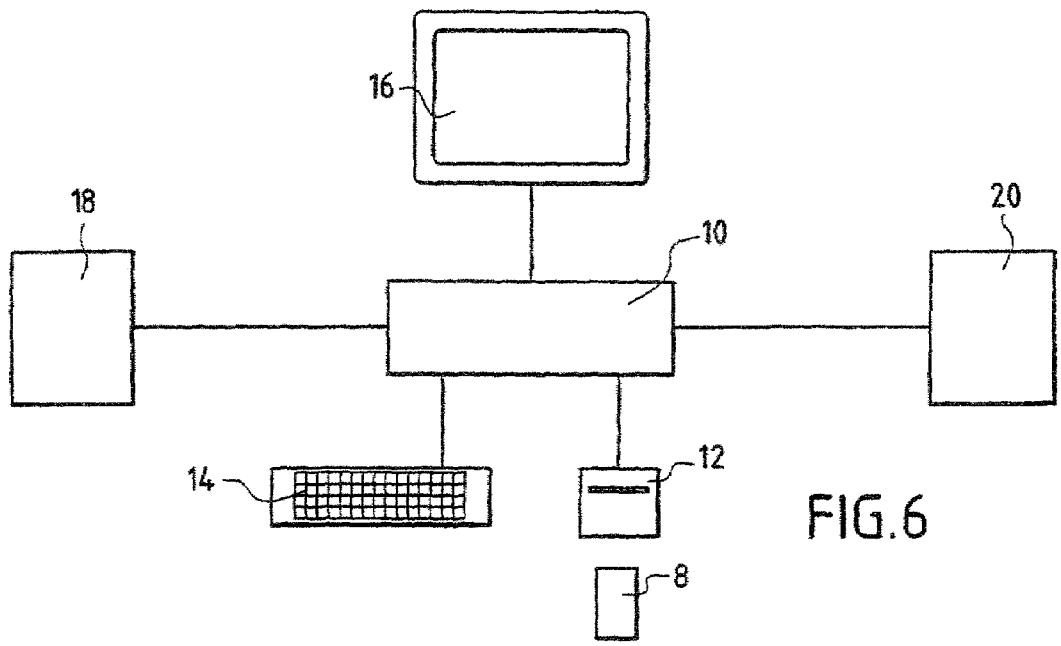
FIG. 6 represents the card and its operating environment.

With reference more particularly to FIG. 6, this shows the card 8 adapted so as to be inserted in a reader 12. The reader 12 is connected to a computer 10 connected to a keyboard 14, a screen 16 and a money distributor 18. The computer 10 is connected to a central computer 20 adapted to store the requested operations.

With reference now to FIG. 8, this figure shows the stages of the method for managing commands in several application files.

In the initial situation marked 80, the user has ordered execution of a command in an application file.

During a first stage marked 81, a search is made to see if the access condition corresponding to said command is stored.

If the access condition is stored, then during a stage marked 82, execution of the command is launched.

If the access condition is not stored, then during a stage marked 83 the user is asked to satisfy the access condition.

Then, if the user satisfies the access condition, during a stage marked 84, the access condition is stored and execution of the command is launched.

There now follows an example of use of the card.

The user inserts the card 8 in the reader 12. At this stage, the table is initialised by the "OS" and the table thus contains no data (FIG. 1).

The user wishes to know the balance of his bank account. To know this, the user orders execution of the command "balance" in the file "bank account".

The "OS" looks to see if the access condition corresponding to the command "balance" is stored, in this case the "OS" looking to see if the condition "CHV1" of the application file "bank account" is stored in the table. As this is not the case because the table is empty, the "OS" asks the user to satisfy the access condition "CHV1". The user enters a confidential code on the keyboard and the user thus satisfies to access condition "CHV1". The "OS" stores the access conditions in the table (FIG. 2) and launches execution of the command "balance", the balance of the bank account of the user then appearing on the screen.

The user wishes to then make a debit from his bank account. In order to do this, the user orders execution of the command "debit" in the "bank account" file.

The "OS" looks to see if the access condition corresponding to the command "debit" is stored, in this case the "OS3 seeking to see if the condition "CHV2" of the "bank account" application file is stored in the table. As this is not the case (FIG. 2), the "OS" asks the user to satisfy the access condition "CHV2". The user enters a confidential code on the keyboard and the user thus satisfies the access condition "CHV2". The "OS" stores the access condition in the table (FIG. 3) and launches execution of the command "debit". The distributor provides the user with the sum requested.

The user then wishes to know the balance of his bank account and check that his bank account has been properly stored. In order to do this, the user orders execution of the command "balance" in the "bank account" file.

The "OS" looks to see if the access condition corresponding to the command "balance" is stored, in this case the "OS" looking to see if the condition "CHV1" of the "bank account application file is stored in the table: as this is stored (FIG. 3), the "OS" launches execution of the command "balance". The balance of the bank account of the user appears on the screen and clearly shows the new balance, that is the amount indicated at the time of the first command of the "balance operation reduced by the debited sum at the time of the "debit" operation.

The user wishes to know the balance of his stock exchange account. Here, the user orders execution of the command "stock exchange account balance" in the file "stock exchange".

The "OS" looks to see if the access condition corresponding to the command "stock exchange account balance" is stored, in this case the "OS" looking to see if the condition "CHV1" of the "stock exchange" application is stored in the table: as this is not the case (FIG. 3), the "OS" asks the user to satisfy the access condition "CHV1". The user enters a confidential code on the keyboard and the user then satisfies the access condition "CHV1". The "OS" stores the access condition in the table (FIG. 4) and launches execution of the command "stock exchange account balance", the balance of the stock exchange account of the user appearing on the screen.

The user now wishes to know the stock exchange shares he has in his portfolio. Here, the user orders execution of the command "stocks" in the "stock exchange file.

The "OS" looks to see if the access condition corresponding to the command "stocks" is stored, in this case the "OS" looking to see if the condition "CHV1" of the "stock exchange" application file is stored in the table: since it is (FIG. 4), the "OS" launches execution of the command "shares" and the stock exchange shares held by the user appear on the screen.

The user now wishes to sell certain stock exchange shares. Here, the user orders execution of the command "sale order" in the "stock exchange" file.

The "OS" looks to see if the access condition corresponding to the command "stock exchange account balance" is stored and in this cases the "OS" looks to see if the condition "CHV2" is the "stock exchange" application file is stored in the table. Since this is not the case (FIG. 4), the "OS" asks the user to satisfy the access condition "CHV2". The user enters a confidential code on the keyboard and the user thus satisfies the access condition "CHV2". The "OS" stores the access condition in the table (FIG. 5) and launches execution of the command "sale order" and the "OS" thus passes the order of the shares sold by the user.

The user then wishes to know the balance of his stock exchange account and check that his stock exchange account has been credited with the amount of the shares sold. Here the user orders execution of the command "stock exchange account balance" in the "stock exchange" file.

The "OS" looks to see if the access condition corresponding to the command "stock exchange account balance" is stored and here the "OS" looks to see if the condition "CHV1" of the "stock exchange" application file is stored in the table. Since this is the case (FIG. 5), the "OS" launches execution of the command "stock exchange account balance". The balance of the stock exchange account of the user appears on the screen and indicates the new balance, that is the amount indicated at the time of the first command of the "stock exchange account balance" operation increased by the sum freed on selling of the stock exchange shares.

The user wishes to transfer a sum from his stock exchange account onto his bank account. Here, he orders execution of the command "transfer to bank account" in the "stock exchange" file.

The "OS" looks to see if the access condition corresponding to the command "transfer to bank account" is stored, the "OS" here looking to se if the condition "CHV2" of the "stock exchange" application file is stored in the table. Since it is (FIG. 5), the "OS" launches execution of the command "transfer to bank account".

The user then wishes to know the balance of his bank account and check that his bank account has been credited. Here the user orders execution of the command "balance" in the "bank account file.

The "OS" looks to see if the access condition corresponding to the command "balance" is stored, namely that the condition "CHV1" of the "bank account" application file is stored in the table. This being the case (FIG. 5), the "OS" launches execution of the command "credit". The balance of the bank account of the user appears on the screen and indicates the new balance, that is the amount indicated at the time of the second command of the "balance" operation increased by the sum transferred at the time of the "transfer to bank account" operation.

The user then wishes to know the balance of his stock exchange account and check that this account has been debited. Here the user orders execution of the command "stock exchange account balance" in the "stock exchange" file.

The "OS" looks to see if the access condition corresponding to the command "stock exchange account balance" is stored, namely the condition "CHV1" of the "stock exchange" application file in the table. This being the case (FIG. 5), the "OS" launches execution of the command "stock exchange account balance" and this balance of the user then appears on the screen and indicates the new balance, that is the amount indicated at the time of the first command of the "stock exchange account balance" operation reduced by the sum transferred at the time of the "transfer to bank account" operation.

The user decides to stop ordering commands and closes the card session he has carried out causing the table to be initialised, that is for all the data is going to be deleted. Then the user removes the card from the reader.

For reasons of security, if during use of the card the latter is removed from the reader, the data of the table is automatically deleted.

Finally, the user has at the most to enter his password a number of times equal to the number of distinct access conditions which may be less than the number of files, even if he has accessed at separate occasions several times to a given file. Thus, the number of enterings of the password by the user is limited.

Of course, the present invention is not restricted to the embodiment described and shown above which has been given solely by way of example. In particular, it includes all the means constituting equivalent techniques of the means described and their combinations if these are executed according to the ways and means of the invention.

What is claimed is:

1. A method for managing a plurality of commands in a plurality of application files of a microchip card, each command of the plurality of commands in each application file of the plurality of application files corresponding to an access condition that a user must meet so that the command is executed, wherein the method comprises the following steps:
    providing a table in the memory of the microchip card for referencing access conditions met by the user to the plurality of commands of the plurality of application files;
    when a command in one of the plurality of application files has been accessed by the user, referencing the access condition corresponding to the command as met by the user in the memory table; and
    when a user orders execution of the command in one of the plurality of application files, checking whether the access condition corresponding to the command is referenced in the memory table, and initiating execution of the command in case the access condition is referenced in the memory table,
    said checking and initiating of the execution comprising:
        making a search to see, when the user has ordered execution of the command in one of the plurality of application files, to seek a reference to the access condition corresponding to the command in the memory table,
        launching the ordered execution of the command when the access condition is referenced, and
        asking the user to satisfy the access condition when said condition is not referenced, and upon satisfying the access condition, referencing the access condition and launching the execution of the ordered execution of the command,
    wherein with n denoting a whole number greater than or equal to two and the user having satisfied n access conditions, the latest n satisfied access conditions are referenced.

2. The method according to claim 1, wherein when a new access condition is satisfied by the user and said new access condition is not referenced, when n access conditions are referenced, the oldest satisfied reference to an access condition is deleted from the memory and the newly-satisfied access condition is referenced.

3. The method according to claim 1 or 2, wherein n is equal to the number of access conditions for the plurality of commands of the plurality of application files.

4. The method according to claim 1 or 2, wherein n is greater than the number of access conditions for the plurality of commands of the plurality of application files.

5. The method according to claim 1 or 2, wherein n is less than the number of access conditions for the plurality of commands of the plurality of application files.

6. The method according to claim 1, wherein, when a contact set up to start said command management method is interrupted, all references to access conditions are deleted.

7. A microchip card adapted to manage a plurality of commands in a plurality of application files of a microchip card, each command of the plurality of commands in each application file of the plurality of application files corresponding to an access condition that a user must meet so that the command is executed, wherein the microchip card comprises:
    a memory table which references access conditions met by the user to the plurality of commands of the plurality of application files;
    stored instruction for automatically referencing in the memory table the access condition corresponding to a command when such command has been accessed by the user; and
    stored instructions for automatically checking when a user orders execution of the command of one of the plurality of application files whether the access condition corresponding to the command is referenced in the memory table, and for initiating execution of the command in case the access condition is referenced in the memory table,
    said instructions for automatically checking and initiating execution comprising instructions for:
        means for seeking a reference to the access condition corresponding to the command in the memory table,
        means for launching execution of the command when the access condition is referenced,
        means for asking the user to satisfy the access condition when the access condition is not referenced, and
        means for referencing the access condition and launching execution of the order in case the user satisfies the access condition,
    wherein, with n denoting a whole number greater or equal to two and the user having satisfied n access conditions, means for referencing the latest n satisfied access conditions.

8. The microchip card according to claim 7, comprising, when a new access condition is satisfied by the user, said access condition not being referenced and n access conditions being referenced, means for deleting from the memory the oldest satisfied access condition reference and for referencing the newly-satisfied access condition.

9. The microchip card according to claim 7 or 8, in which n is equal to the number of access conditions for the plurality of commands of the plurality of the application files.

10. The microchip card according to claim 7 or 8 in which n is greater than the number of access conditions for the plurality of commands of the plurality of the application files.

11. The microchip card according to claim 7 or 8 in which n is less than the number of access conditions for the plurality of commands of the plurality of the application files.

12. The microchip card according to claim 7, comprising a contact and suitable means for deleting all references to access conditions when said contact is interrupted.

13. A method for managing a plurality of commands in a plurality of application files of a microchip card, each command of the plurality of commands in each application file of the plurality of application files being corresponding to an access condition that a user must meet so that the command is executed, wherein the method comprises the following steps:

providing a table in the memory of the microchip card for referencing access conditions met by the user to the plurality of commands of the plurality of application files;

when a command in one of the plurality of application files has been accessed by the user, referencing the access condition corresponding to the command as met by the user in the memory table; and when a user orders execution of the command in one of the plurality of application files, checking whether the access condition corresponding to the command is referenced in the memory table, and initiating execution of the command in case the access condition is referenced in the memory table, said checking and initiating of the execution comprising:
  making a search to see, when the user has ordered execution of the command in one of the plurality of application files, to seek a reference to the access condition corresponding to the command in the memory table,
  launching the ordered execution of the command when the access condition is referenced, and
  asking the user to satisfy the access condition when said condition is not referenced, and upon satisfying the access condition, referencing the access condition and launching the execution of the ordered execution of the command, wherein when a contact set up to start said command management method is interrupted, all references to access conditions are deleted.

14. A microchip card adapted to manage a plurality of commands in a plurality of application files of a microchip card, each command of the plurality of commands in each application file of the plurality of application files being corresponding to an access condition that a user must meet so that the command is executed, wherein the microchip card comprises:
  a contact and suitable means for deleting all references to access conditions when said contact is interrupted;
  a memory table which references access conditions met by the user to the plurality of commands of the plurality of application files;
  stored instructions for automatically referencing in the memory table the access condition corresponding to a command when such command has been accessed by the user; and
  stored instructions for automatically checking when a user orders execution of the command of one of the plurality of application files whether the access condition corresponding to the command is referenced in the memory table, and for initiating execution of the command in case the access condition is referenced in the memory table,
  said instructions for automatically checking and initiating execution comprising instructions for:
    means for seeking a reference to the access condition corresponding to the command in the memory table,
    means for launching execution of the command when the access condition is referenced,
    means for asking the user to satisfy the access condition when the access condition is not referenced, and
    means for referencing the access condition and launching execution of the order in case the user satisfies the access condition.

* * * * *